(12) United States Patent
Matson et al.

(10) Patent No.: US 6,667,953 B2
(45) Date of Patent: Dec. 23, 2003

(54) OPTICAL DISK PROTECTOR AND METHOD OF USE

(76) Inventors: Seth Matson, 18920 Breezy La., Huntington Beach, CA (US) 92648; Jonathan Tufo, 4968 Pearce St., Huntington Beach, CA (US) 92649

(*) Notice: Subject to any disclaimer, the term of this patent is extended or adjusted under 35 U.S.C. 154(b) by 0 days.

(21) Appl. No.: 10/026,244

(22) Filed: Dec. 21, 2001

(65) Prior Publication Data

US 2003/0117937 A1 Jun. 26, 2003

(51) Int. Cl.⁷ .................................................. G11B 7/24
(52) U.S. Cl. ...................................................... 369/291
(58) Field of Search ................................ 369/291, 282, 369/290, 289, 280; 283/81

(56) References Cited

U.S. PATENT DOCUMENTS

| | | | |
|---|---|---|---|
| 4,983,437 A | 1/1991 | Merrick | 428/40 |
| 5,299,186 A | 3/1994 | Tsurushima | 369/291 |
| 5,725,934 A | 3/1998 | Gallant | 428/195 |
| 5,757,765 A | 5/1998 | Chen | 369/291 |
| 5,787,069 A | 7/1998 | Lowe et al. | 369/291 |
| 5,799,982 A * | 9/1998 | McClure et al. | 283/81 |
| 5,848,687 A | 12/1998 | Shultz | 206/308.1 |
| 6,002,663 A * | 12/1999 | Sandstrom | 369/282 |
| 6,081,501 A | 6/2000 | Hunter et al. | 369/290 |
| 6,144,632 A | 11/2000 | Burroughs | 369/291 |
| 6,151,294 A * | 11/2000 | Parlog et al. | 369/289 |
| 6,192,025 B1 * | 2/2001 | Chen | 369/291 |
| 6,240,061 B1 | 5/2001 | Burroughs | 369/291 |
| 2002/0114264 A1 | 8/2002 | Kuchman | 369/275.3 |
| 2002/0167892 A1 * | 11/2002 | Kim et al. | 369/280 |

FOREIGN PATENT DOCUMENTS

EP            554885 A2 *  8/1993

* cited by examiner

Primary Examiner—Tianjie Chen
(74) Attorney, Agent, or Firm—Eric Karich

(57) ABSTRACT

An optical disk protection system for protecting an optical disk includes an annular protective ring that has a contact surface, an outer surface opposing the contact surface, an inner perimeter, and an outer perimeter. The annular protective ring is adapted to fit on the optical disk such that it functions to protect the optical disk from damage without interfering with the operation of the optical disk. The optical disk protection system preferably further includes an applicator having an applicator engagement ring and an applicator perimeter. The applicator engagement ring is located concentrically within the applicator perimeter and adapted to frictionally engage the central aperture of the optical disk. The applicator perimeter is shaped to frictionally engage the inner perimeter of the annular protective ring, such that when the applicator engagement ring of the applicator is engaged with the central aperture of the optical disk, the annular protective ring is held adjacent the optical disk and correctly positioned for being adhesively mounted upon the optical disk.

20 Claims, 2 Drawing Sheets

OPTICAL DISK PROTECTOR AND METHOD OF USE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to optical disk protection devices, and more particularly to a protective ring that is adapted to be applied on an inner perimeter of the optical disk to help prevent the optical disk from being scratched.

2. Description of Related Art

The following art defines the present state of this field:

Chen, U.S. Pat. No. 6,192,025, teaches a structure for protecting the reading area of an optical disk such as a compact disk (CD). The protector includes a transparent protective film and a two-side-adhesive ring. The protective film has an outer diameter equal to or slightly smaller than the outer diameter of the compact disk, and a center hole with a diameter greater than the protruded ring of the compact disk. A two-side-adhesive ring is used to adhere the protective film to the CD. The adhesive ring is less than 0.5 mm thick, has an inner diameter equal to or slightly greater than the protruded ring of the compact disk, and has an outer diameter greater than the inner diameter thereof by 2–5 mm. The maximum diameter of the adhesive ring is therefore 20 mm. Chen also teaches an applicator device for applying the adhesive ring onto the CD so that the adhesive ring is applied to the correct portion of the CD.

Chen, U.S. Pat. No. 5,757,765, teaches a similar structure as described in Chen ('025); however, the protective film is secured in place with an annular adhesive sheet having an adhesive surface which can be adhered on the inner annular portion of the disk over a plurality of ribs of the protective sheet.

Hunter, U.S. Pat. No. 6,081,501, teaches a write-protect ring for attachment to an optical disk. The invention includes a system for attaching an adhesive backed write-protect ring to an optical disk with the center of the ring aligned to the center of the central hole in the disk. The write protect disk is shaped and sized to be positioned over the power calibration area of the optical disk to prevent accidental writing onto the optical disk. A write-protect assembly is formed from a multi-layer material having an adhesive backed label layer and a backing layer. The write-protect assembly includes a removable innermost area that, when removed, forms a hole having a diameter that is the same diameter as the central hole of an optical disk. The innermost area is at least partially surrounded by a ring shaped alignment area that is also removable. Finally, the alignment area is surrounded by the write-protect ring. The central area of the assembly is punched out to form a hole and the backing material is removed from at least part of the write protect area, exposing the adhesive coated surface. The assembly and an optical disk are placed onto an alignment cylinder. The alignment area of the write-protect assembly ensures that the center of the write-protect ring is aligned to the center of the hole in the disk. Finally, the disk with write-protect ring and alignment area attached is removed from the alignment cylinder and the alignment area of the write-protect assembly is removed, leaving just the write-protect ring attached to the disk. The hub of the plastic insert tray of a CD jewel case may be used for an alignment cylinder. In an alternative embodiment of the invention, the write-protect assembly is placed onto the hub first, and the design of the assembly is such that the hub helps remove the central area and the hub helps removal of the backing over the write-protect ring.

The prior art also teaches a protector similar to the present invention, only the protector is positioned on the outer perimeter of the CD. Shultz, U.S. Pat. No. 5,848,687, teaches a flexible protector ring that can be "snapped" onto the outer periphery of a disk-like recording medium, wherein the outer periphery of the recording medium fits into an annular slot on the inner surface of the protector ring, and the dimension of the protector ring in the direction normal to the plane of that medium/protector ring combination is sufficient to raise the exposed inward and downward surface of the medium far enough above a flat surface onto which the combination is placed to avoid contact with dust and dirt on the table top. The "upper" surface of the protector ring is provided with an annular slot or groove, and the "lower" surface of the protector ring is provided with an annular tip sized to fit within that annular slot or groove of a second protector ring, whereby two or more such medium/protector ring combinations can be stacked one upon the other such that lateral movement of one relative to the other will be precluded.

Various other protectors are also shown in the prior art. Tsurushima, U.S. Pat. No. 5,299,186, teaches a disk protecting cover for preventing a CD from being damaged when the disk is not in use. The cover includes a flat portion having a diameter smaller than that of a disk which is provided with a center hole and a signal reading surface portion formed on a part of the surface thereof extending around the center hole, and an engaging portion projecting from a central part of the flat portion and adapted to be inserted into the center hole of the disk to engage with the same. The flat portion covers the signal reading surface portion of the disk when the engaging portion is inserted into the center hole of the disk to engage with the same. The disk protecting cover is attached to the disk to be detachable therefrom and can reliably protect the signal reading surface portion of the disk against damage.

Gallant, U.S. Pat. No. 5,725,934, teaches a display device having masking disks having a transparent area for viewing printed matter on a compact disk. A protective layer includes a bushing extending through a central hole of the compact disk so that each masking disk and substrate disk are rotatably mounted relative to each other. The bushing cooperates with a securing disk to maintain the masking disks and substrate disk together. The securing disk includes means for mounting the display device on a substrate independent of the display device.

Various references teach a compact disk protector that includes a sheet of material that is adhesively attached to cover the CD, including the following: Merrick, U.S. Pat. No. 4,983,437, Lowe, U.S. Pat. No. 5,787,069, Burroughs (U.S. Pat. Nos. 6,240,061 and 6,144,632), and Chirchi, WO 95/12881.

The prior art teaches various protective rings that are adhered to the underside of an optical disk. However, the prior art does not teach a protective ring having inner and outer diameters and the thickness of the present invention.

The precise inner and outer diameters of the protective ring are critical to the proper function of the optical disk, and the prior art does not teach a protective ring with the properties described below. The present invention fulfills these needs and provides further related advantages as described in the following summary.

SUMMARY OF THE INVENTION

The present invention teaches certain benefits in construction and use which give rise to the objectives described below.

The present invention provides an optical disk protection system for protecting an optical disk. The optical disk protection system includes an annular protective ring that has a contact surface, an outer surface opposing the contact surface, an inner perimeter, and an outer perimeter. The annular protective ring is adapted to fit on the optical disk such that it functions to protect the optical disk from damage without interfering with the operation of the optical disk. The optical disk protection system preferably further includes an applicator having an applicator engagement ring and an applicator perimeter. The applicator engagement ring is located concentrically within the applicator perimeter and adapted to frictionally engage the central aperture of the optical disk. The applicator perimeter is shaped to frictionally engage the inner perimeter of the annular protective ring, such that when the applicator engagement ring of the applicator is engaged with the central aperture of the optical disk, the annular protective ring is held adjacent the optical disk and correctly positioned for being adhesively mounted upon the optical disk.

A primary objective of the present invention is to provide an optical disk protection system having advantages not taught by the prior art.

Another objective is to provide an annular protective ring that is adapted to fit on the optical disk such that it functions to protect the optical disk from damage without interfering with the operation of the optical disk.

A further objective is to provide an applicator that enables a user to easily mount the annular protective ring in its correct position on the optical disk.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
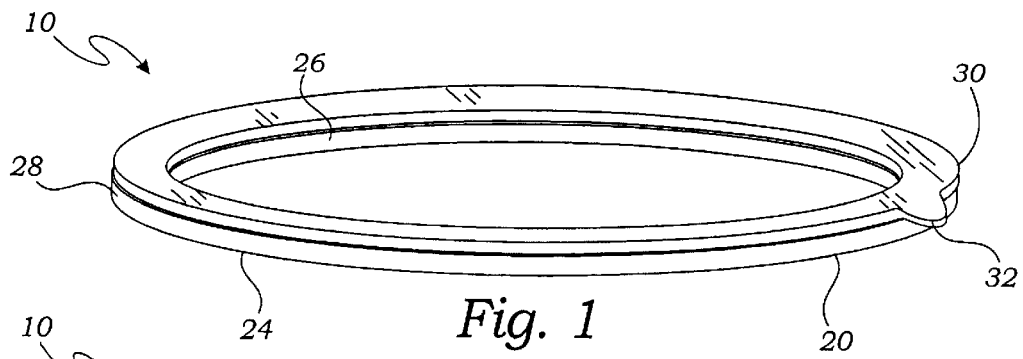
FIG. 1 is a top perspective view of an annular protective ring.
Figure 2:
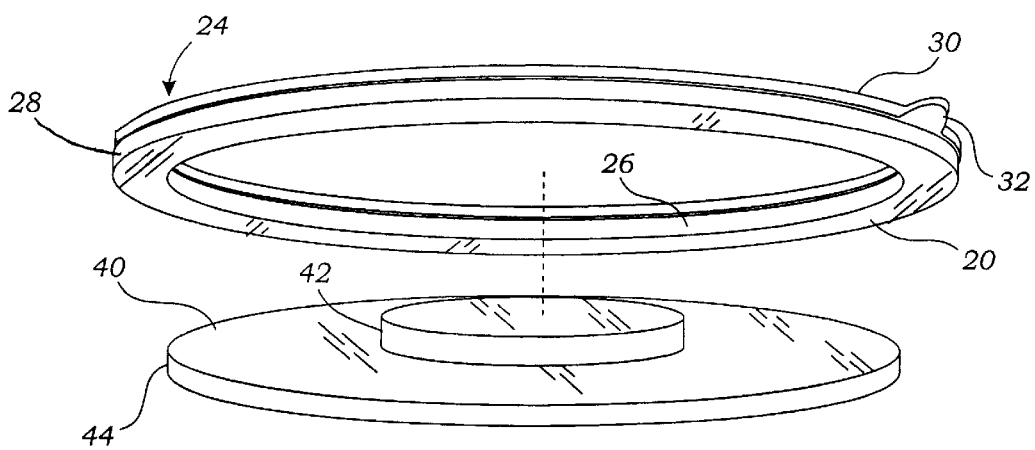
FIG. 2 is a bottom perspective view of the an annular protective ring being mounted upon an applicator.
Figure 3:
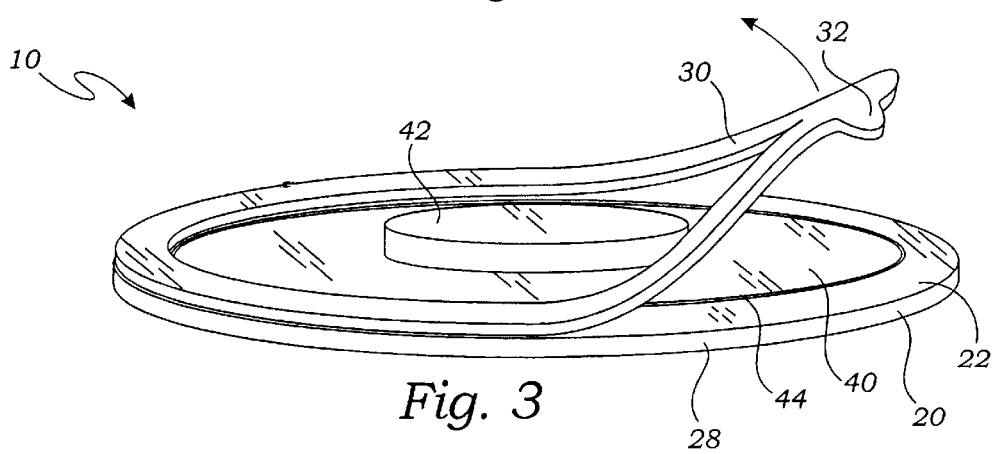
FIG. 3 is a bottom perspective view thereof, illustrating how a peel removable paper layer can be removed from the annular protective ring.

The above-described drawing figures illustrate the invention, an optical disk protection system 10 for protecting an optical disk 12. As shown in FIG. 1, the optical disk protection system 10 includes an annular protective ring 20 that, when properly positioned on the optical disk 12, helps to protect the optical disk 12 from damage. As shown in FIGS. 2–3, the optical disk protection system 10 can further include an applicator 40 that facilitates the proper positioning of the annular protective ring 20 upon the optical disk 12. Both the annular protective ring 20 and the applicator 40 are described in greater detail below.

Figure 4:
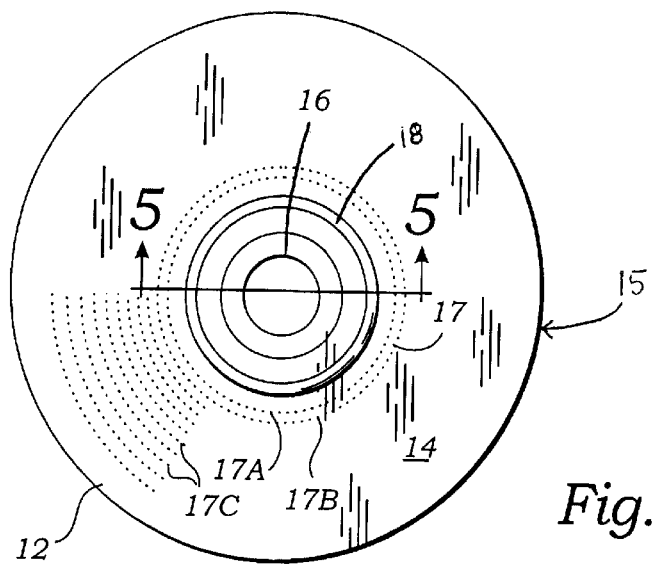
FIG. 4 is a bottom plan view of an optical disk.

To understand the structure of the annular protective ring 20, it is first necessary to understand the structure of the optical disk 12. As shown in FIG. 4, the optical disk 12 includes a top disk surface 13, a bottom disk surface 14 opposing the top disk surface 13, an outer disk perimeter 15, and a central aperture 16 positioned at the center of the outer disk perimeter 15. A plurality of operative tracks 17 are positioned concentrically within the outer disk perimeter 15 and around an annular protruding ring 18 that is positioned concentrically around the central aperture 16.

The plurality of operative tracks 17 closest to the central aperture 16 typically have a diameter of approximately 44–45 mm, usually 44.7 mm, although alternative embodiments of the optical disk 12 might have different parameters. The plurality of operative tracks 17 preferably include a power calibration area 17A, a program memory area 17B, and data tracks 17C that contain the actual data. The optical disk 12 is more thoroughly described in Hunter et al., U.S. Pat. No. 6,081,501, hereby incorporated by reference in full. Since the optical disk 12 is well known in the prior art, it is not described in greater detail herein. It is worth noting, however, that the annular protective ring 20 can be modified by those skilled in the art when it is intended to be used with an optical disk 12 having different parameters, and such obvious modifications of the annular protective ring 20 should be considered within the scope of the claimed invention.

As shown in FIGS. 1–3 and 5–6, the annular protective ring 20 has a contact surface 22, an outer surface 24 opposing the contact surface 22, an inner perimeter 26, and an outer perimeter 28. The annular protective ring 20 is adapted to be operatively positioned upon the optical disk 12 between the annular protruding ring 18 and the plurality of operative tracks 17. The annular protective ring 20 functions to protect the optical disk 12 from damage.

As shown in FIG. 1, the outer surface 24 is a generally smooth and featureless surface that functions merely to contact a work surface 50 to protect the optical disk 12 from damage. In the preferred embodiment, the outer surface 24 includes a beveled edge surface 34 adjacent the outer perimeter 28. The beveled edge surface 34 functions to facilitate the movement of the optical disk 12 into and out of an optical disk player (not shown). The outer surface 24 preferably is a smooth, non-stick surface (without any adhesives) that further facilitates the movement of the optical disk 12 into and out of the optical disk player.

As shown in FIGS. 2–3, the contact surface 22 is only required to be a simple surface that is used to bond the annular protective ring 20 to the optical disk 12. The contact surface 22 is separated from the outer surface 24 by a thickness of 0.30–1.10 mm, preferably approximately 0.50–1.10 mm, more preferably 0.5–0.8, and most preferably either 0.508 mm or 0.762 mm. As shown in FIGS. 2–3, the contact surface 22 preferably includes a means for adhering the annular protective ring 20 to the optical disk 12. The means for adhering is preferably an adhesive layer (not shown) coating the contact surface 22 and covered with a layer of peel-removable paper 30. The layer of peel-removable paper 30 preferably includes a pull tab 32 to facilitate grasping the layer of peel-removable paper 30 and peeling it from the contact surface 22. Once the layer of peel-removable paper 30 has been removed, as shown in FIG. 3, the contact surface 22 will stick to the optical disk 12 upon contact. In another embodiment, the annular protective ring 20 is constructed of a plastic film that will bond to the optical disk 12 through static attraction, without adhesives. The annular protective ring 20 is preferably applied to the optical disk 12 using the applicator 40, described in greater detail below.

Figure 5:
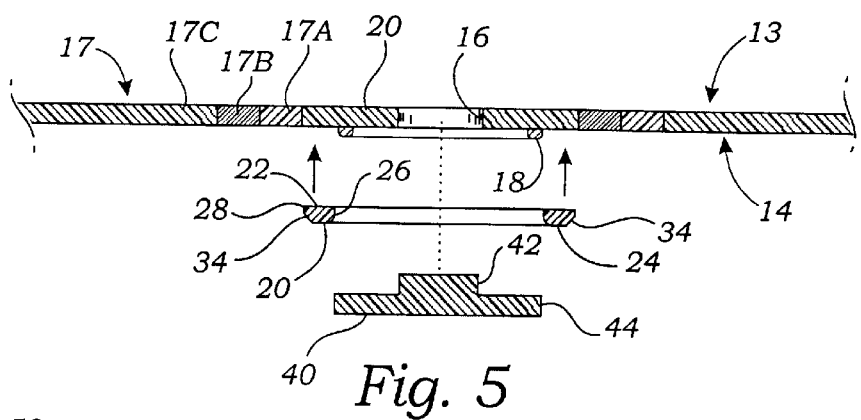
FIG. 5 is a sectional view thereof taken along line 5—5 in FIG. 4, the view illustrating how the applicator is used to correctly mount the annular protective ring.
Figure 6:
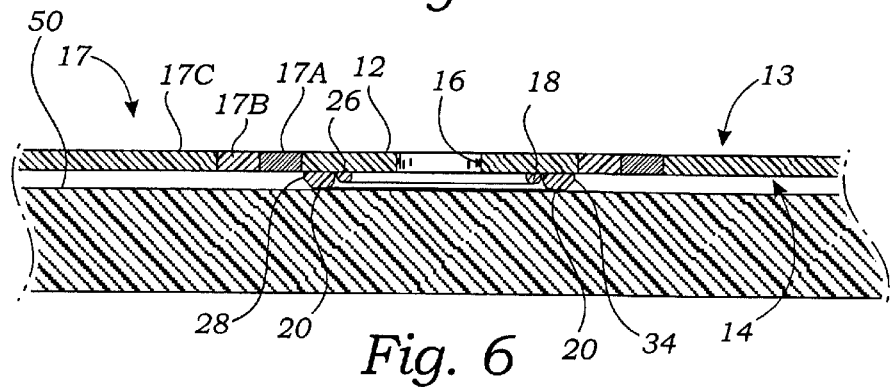
FIG. 6 is another section view thereof illustrating how the optical disk is supported by the annular protective ring when placed upon a work surface.

As shown in FIGS. 5-6, the annular protective ring 20 is shaped to fit concentrically around the annular protruding ring 18 of the optical disk 12 and inside the plurality of operative tracks 17. For function with the standard optical disk 12 (a compact disk, or CD), the inner perimeter 26 has a diameter of greater than the diameter of the annular protruding ring 18, and is typically between 38-44 mm, preferably 38-40 mm, and most preferably approximately 39 mm. The outer perimeter 28 has a diameter of greater than the inner perimeter 26 but less than the diameter of the plurality of operative tracks 17. When the optical disk 12 is a CD, the outer perimeter 28 has a diameter of greater than the inner perimeter 26 but less than 44.7 mm, preferably between 42-44 mm, and most preferably approximately 43 mm. It is important that the annular protective ring 20 not extend over the annular protruding ring 18 because this would interfere with the proper mounting of the optical disk 12 within the optical disk player (not shown). It is important that the annular protective ring 20 not extend over the plurality of operative tracks 17 because this would interfere with the reading of the optical disk 12 by the optical disk player.

While the preferred embodiment of the annular protective ring 20 is described above, alternative embodiments should be considered within the scope of the claimed invention. For example, the contact surface 22 could be formed integrally with the optical disk 12, such as when the annular protective ring 20 is formed as part of the manufacturing of the optical disk 12. Such alternative embodiments are considered within the scope of the claimed invention.

The optical disk protection system 10 preferably further includes an applicator 40 for correctly positioning the annular protective ring 20 on the optical disk 12. The applicator 40 is particularly important because it is critical that the annular protective ring 20 be correctly positioned. Incorrect positioning can render the optical disk 12 unreadable or inoperative.

As shown in FIGS. 2-3 and 5-6, the applicator 40 has an applicator engagement ring 42 and an applicator perimeter 44. The applicator engagement ring 42 is located concentrically within the applicator perimeter 44 and adapted to frictionally engage the central aperture 16 of the optical disk 12. The applicator perimeter 44 is shaped to frictionally engage the inner perimeter 26 of the annular protective ring 20, such that when the applicator engagement ring 42 of the applicator 40 is engaged with the central aperture 16 of the optical disk 12, the annular protective ring 20 is held adjacent the optical disk 12 and correctly positioned for being adhesively mounted upon the optical disk 12.

As shown in FIGS. 2-3, once the annular protective ring 20 is positioned around the applicator perimeter 44, the layer of peel-removable paper 30 is removed to expose the contact surface 22. As shown in FIG. 5, the applicator engagement ring 42 is then inserted into and engaged with the central aperture 16, thereby positioning the annular protective ring 20 in the optical disk 12 so that the contact surface 22 is bonded to the bottom disk surface 14. As shown in FIG. 6, the optical disk 12 can be placed on a work surface 50 such that the optical disk 12 is supported upon the work surface 50 by the annular protective ring 20. Once correctly positioned, the annular protective ring 20 functions to raise the optical disk 12 off of the work surface 50, thereby protecting the optical disk 12 from scratches and other damage.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An optical disk protection system for protecting an optical disk, the optical disk having a plurality of operative tracks and a central aperture, the optical disk protection system comprising:

an annular protective ring having a contact surface, an outer surface opposing the contact surface, an inner perimeter, and an outer perimeter, the contact surface including a means for adhering the annular protective ring to the optical disk, the contact surface being separated from the outer surface by a thickness of 0.30-1.10 mm, the inner perimeter having a diameter of between 38-44 mm, and the outer perimeter having a diameter of greater than the inner perimeter but less than 44.7 mm, the annular protective ring being shaped to fit concentrically around the central aperture of the optical disk and inside the plurality of operative tracks.

2. The optical disk protection system of claim 1 further comprising an applicator, the applicator having an applicator engagement ring and an applicator perimeter, the applicator engagement ring being located concentrically within the applicator perimeter and adapted to frictionally engage the central aperture of the optical disk, and the applicator perimeter being shaped to frictionally engage the inner perimeter of the annular protective ring, the applicator being shaped such that when the applicator engagement ring of the applicator is engaged with the central aperture of the optical disk, the annular protective ring is held adjacent the optical disk and correctly positioned for being adhesively mounted upon the optical disk concentrically positioned within the plurality of operative tracks.

3. The optical disk protection system of claim 1 wherein the inner perimeter has a diameter of between 38-40 mm and the outer perimeter has a diameter of between 42-44 mm.

4. The optical disk protection system of claim 1 wherein the inner perimeter has a diameter of approximately 39 mm and the outer perimeter has a diameter of approximately 43 mm.

5. The optical disk protection system of claim 1 wherein the contact surface is separated from the outer surface by a thickness of 0.50-1.10 mm.

6. The optical disk protection system of claim 1 wherein the contact surface is separated from the outer surface by a thickness of 0.50-0.80 mm.

7. The optical disk protection system of claim 1 wherein the outer surface includes a beveled edge surface adjacent the outer perimeter.

8. The optical disk protection system of claim 1 wherein the outer surface has a non-stick surface.

9. An optical disk protection system for protecting an optical disk, the optical disk having a plurality of operative tracks and a central aperture, the optical disk protection system comprising:

an annular protective ring having a contact surface, an outer surface opposing the contact surface, an inner perimeter, and an outer perimeter, the contact surface including a means for adhering the annular protective ring to the optical disk, the contact surface being separated from the outer surface by a thickness of 0.30–1.10 mm, the inner perimeter having a diameter of between 38–44 mm, and the outer perimeter having a diameter of greater than the inner perimeter but less than 44.7 mm; and an applicator having an applicator engagement ring and an applicator perimeter, the applicator engagement ring being located concentrically within the applicator perimeter and adapted to frictionally engage the central aperture of the optical disk, and the applicator perimeter being shaped to frictionally engage the inner perimeter of the annular protective ring, such that when the annular protective ring is positioned around the applicator perimeter and the applicator engagement ring of the applicator is engaged with the central aperture of the optical disk, the annular protective ring is held adjacent the optical disk, correctly positioned concentrically around the central aperture of the optical disk and inside the plurality of operative tracks of the optical disk.

10. The optical disk protection system of claim 9 wherein the inner perimeter has a diameter of between 38–40 mm and the outer perimeter has a diameter of between 42–44 mm.

11. The optical disk protection system of claim 9 wherein the inner perimeter has a diameter of approximately 39 mm and the outer perimeter has a diameter of approximately 43 mm.

12. The optical disk protection system of claim 9 wherein the contact surface is separated from the outer surface by a thickness of 0.30–1.10 mm.

13. The optical disk protection system of claim 9 wherein the contact surface is separated from the outer surface by a thickness of 0.50–1.10 mm.

14. The optical disk protection system of claim 9 wherein the outer surface includes a beveled edge surface adjacent the outer perimeter.

15. The optical disk protection system of claim 9 wherein the outer surface has a non-stick surface.

16. An optical disk comprising:

a top disk surface;

a bottom disk surface opposing the top disk surface;

an outer disk perimeter;

a central aperture positioned at the center of the outer disk perimeter;

an annular protruding ring that is positioned concentrically around and adjacent to the central aperture;

a plurality of operative tracks positioned concentrically within the outer disk perimeter and outside to annular protruding ring; and an annular protective ring extending downwardly from the bottom disk surface to form an outer surface that extends downwardly from the bottom disk surface approximately 0.30–1.10, the annular protective ring being positioned between the annular protruding ring and the plurality of data tracks, and wherein the annular protective ring has an inner perimeter and an outer perimeter, the inner perimeter having a diameter of between 38–40 mm, and the outer perimeter having a diameter of between 42–44 mm.

17. The optical disk protection system of claim 16 wherein the inner perimeter has a diameter of approximately 39 mm and the outer perimeter has a diameter of approximately 43 mm.

18. A method for protecting an optical disk, the method comprising the steps of:

a) providing the optical disk having a top disk surface, a bottom disk surface opposing the top disk surface, an outer disk perimeter, a central aperture positioned at the center of the outer disk perimeter, and a plurality of operative tracks positioned concentrically within the outer disk perimeter and having a diameter of approximately 44–45 mm;

b) providing an annular protective ring having a contact surface, an outer surface opposing the contact surface, an inner perimeter, and an outer perimeter, the contact surface including a means for adhering the annular protective ring to the optical disk, the contact surface being separated from the outer surface by a thickness of 0.50–1.10 mm, the inner perimeter having a diameter of between 38–44 mm, and the outer perimeter having a diameter of greater than the inner perimeter but less than 44.7 mm; and c) positioning the annular protective ring concentrically around the central aperture of the optical disk and inside the plurality of operative tracks.

19. The method of claim 18 further comprising the steps of:

d) providing an applicator having an applicator engagement ring and an applicator perimeter, the applicator engagement ring being located concentrically within the applicator perimeter and adapted to frictionally engage the central aperture of the optical disk, and the applicator perimeter being shaped to frictionally engage the inner perimeter of the annular protective ring;

e) positioning the annular protective ring around the applicator perimeter of the applicator;

f) engaging the applicator engagement ring of the applicator with the central aperture of the optical disk; and g) bonding the contact surface to the bottom disk surface.

20. The method of claim 18 further comprising the steps of:

d) placing the optical disk on a work surface such that the optical disk is supported upon the work surface by the annular protective ring.

* * * * *